(12) United States Patent
Sadilek

(10) Patent No.: US 9,176,480 B2
(45) Date of Patent: Nov. 3, 2015

(54) GESTURE-BASED TIME INPUT

(71) Applicant: Google Inc., Mountain View, CA (US)

(72) Inventor: Daniel Sadilek, Zurich (CH)

(73) Assignee: Google Inc., Mountain View, CA (US)

( * ) Notice: Subject to any disclaimer, the term of this patent is extended or adjusted under 35 U.S.C. 154(b) by 217 days.

(21) Appl. No.: 14/076,896

(22) Filed: Nov. 11, 2013

(65) Prior Publication Data

US 2014/0219066 A1    Aug. 7, 2014

Related U.S. Application Data

(60) Provisional application No. 61/761,068, filed on Feb. 5, 2013.

(51) Int. Cl.
    *G04G 5/00*      (2013.01)
    *G06F 3/0488*    (2013.01)
    *G06F 3/0484*    (2013.01)

(52) U.S. Cl.
    CPC .............. *G04G 5/00* (2013.01); *G06F 3/04847* (2013.01); *G06F 3/04886* (2013.01)

(58) Field of Classification Search
    CPC ........... G04G 5/00; G04G 9/00; G04G 21/08; G06F 3/04847
    USPC .......................................................... 368/82
    See application file for complete search history.

(56) References Cited

U.S. PATENT DOCUMENTS

| | | | |
|---|---|---|---|
| 7,081,905 B1 * | 7/2006 | Raghunath | G04G 5/00 345/684 |
| 7,907,476 B2 * | 3/2011 | Lee | G04G 5/04 345/173 |
| 7,992,102 B1 | 8/2011 | De Angelo | |
| 8,522,163 B2 * | 8/2013 | Relyea | G04G 9/0082 715/834 |
| 8,978,062 B2 * | 3/2015 | Loebig | G11B 27/34 725/37 |
| 2002/0131331 A1 | 9/2002 | Molander | |
| 2012/0066629 A1 | 3/2012 | Lee et al. | |
| 2012/0092383 A1 * | 4/2012 | Hysek | G04G 21/08 345/684 |
| 2013/0235704 A1 * | 9/2013 | Grinberg | G04G 21/08 368/69 |

OTHER PUBLICATIONS

"[WIDGET][UCCW][THEME] UCCW—Ultimate custom clock—skins", xda developers [online]. Blog last updated on May 17, 2012. Retrieved from the Internet: <http://forum.xda-developers.com/showthread.php?t=1387518&page=309> 8 pgs.

"Analog and Digital Clocks Animation", Math is Fun [online]. First Accessed on Aug. 22, 2012. Retrieved from the Internet: <http://www.mathsisfun.com/time-clocks-analog-digital.html> 1 pg.

(Continued)

*Primary Examiner* — Sean Kayes

(74) *Attorney, Agent, or Firm* — Shumaker & Sieffert, P.A.

(57) ABSTRACT

A computing device is described that outputs for display, a graphical user interface comprising a clock having regions associated with a first set of time increments. Responsive to receiving an indication of an input at a portion of a presence-sensitive input device corresponding to a location of a display device at which one of the regions of the clock is displayed, the computing device determines one of the first set of time increments. The computing device outputs for display, and proximate to the location, a second set of time increments. The computing device determines a time based on the determined one of the first set of time increments and a selected one of the second time increments.

20 Claims, 8 Drawing Sheets

(56) References Cited

OTHER PUBLICATIONS

Stiller, "How to Drag Clock Hands in a Circle", David Stiller's blog [online]. Aug. 16, 2006. Retrieved from the Internet: <http://www.quip.net/blog/2006/flash/actionscript-20/how-to-drag-clock-hands> 2 pgs.
"Set time to Touch Screen Thermo Clock", Fixya [online]. May 8, 2009. Retrieved from the Internet: <http://www.fixya.com/support/t2176542-set_time_touch_screen_thermo_clock> 5 pgs.
"Stopwatch—Android Apps on Google Play", Google [online]. First Accessed on Aug. 22, 2012. Retrieved from the Internet: <https://play.google.com/store/apps/details?id=polis.app.stopwatch&feature=related_apps> 2 pgs.
"Timer++", Apple [online]. Last updated on Oct. 23, 2013. Retrieved from the Internet: <https://itunes.apple.com/us/app/timer++/id498181337?mt=8> 2 pgs.
International Search Report and Written Opinion of International application No. PCT/US2013/077165, mailed Apr. 4, 2014, 8 pp.
International Preliminary Report on Patentability from International Application No. PCT/US2013/077165, dated Aug. 20, 2015, 6 pp.

* cited by examiner

GESTURE-BASED TIME INPUT

This application claims the benefit of U.S. Provisional Application No. 61/761,068, filed Feb. 5, 2013, the entire content of which is hereby incorporated by reference.

BACKGROUND

Some computing devices (e.g., mobile phones, tablet computers, etc.) may provide a graphical time selector or other mechanism as part of a graphical user interface for inputting a time using a presence-sensitive display (e.g., a touchscreen) operatively coupled to the computing device. The computing device may, for example, output the graphical time selector for display in response to an application (e.g., e-mail client, calendar, etc.) request for a time-related data entry from a user of the computing device.

In some cases, the graphical time selector may include text entry fields for entering digits associated with a unit of time (e.g., hour, minute, second) using keys, such as keys provided by a graphical keyboard presented at a presence-sensitive screen. In other examples, the graphical time selector may include one or more virtual selector wheels that rotate in response to an indication of a gesture at a presence-sensitive screen. Through selector wheel rotations, the computing device can increase or decrease a time entry by a unit of time. Still in other cases, graphical time selectors include graphical buttons presented at a presence-sensitive screen that, when selected, can be used to increase and/or decrease a unit of time associated with the time entry.

These graphical time selectors that utilize a graphical keyboard, one or more scroll wheels, and/or graphical buttons, may have certain drawbacks. For example, these graphical time selectors may not provide an efficient way for a computing device to receive an indication of a user input associated with a time entry. These graphical time selectors may require the computing device to receive indications of multiple tap and/or non-tap gestures at a presence-sensitive screen for a single time entry. For each additional time entry, graphical time selectors such as this may additionally require the computing device to receive and process multiple indications of taps and/or non-tap gestures at the presence-sensitive screen.

SUMMARY

In one example, the disclosure is directed to a method that includes outputting, by a computing device and for display, a graphical user interface comprising a clock having regions associated with a first set of time increments. Responsive to receiving an indication of an input at a portion of a presence-sensitive input device corresponding to a location of a display device at which one of the regions of the clock is displayed, the method may include determining, by the computing device, one of the first set of time increments and outputting, for display and proximate to the location, a second set of time increments. The method may include determining, by the computing device, a time based on the determined one of the first set of time increments and a selected one of the second time increments.

In another example, the disclosure is directed to a computing device that includes at least one processor. The at least one processor may be configured to output, for display, a graphical user interface comprising a clock having regions associated with a first set of time increments. Responsive to receiving an indication of an input at a portion of a presence-sensitive input device corresponding to a location of a display device at which one of the regions of the clock is displayed, the at least one processor may be configured to determine, one of the first set of time increments and output, for display and proximate to the location, a second set of time increments. The at least one processor may be configured to determine, a time based on the determined one of the first set of time increments and a selected one of the second time increments.

In another example, the disclosure is directed to a computer-readable storage medium encoded with instructions that, when executed, cause at least one processor of a computing device to output, for display, a graphical user interface comprising a clock having regions associated with a first set of time increments. Responsive to receiving an indication of an input at a portion of a presence-sensitive input device corresponding to a location of a display device at which one of the regions of the clock is displayed, the instructions, when executed, may cause the at least one processor of the computing device to determine, one of the first set of time increments and output, for display and proximate to the location, a second set of time increments. The instructions, when executed, may cause the at least one processor of the computing device to determine, a time based on the determined one of the first set of time increments and a selected one of the second time increments.

The details of one or more examples are set forth in the accompanying drawings and the description below. Other features, objects, and advantages of the disclosure will be apparent from the description and drawings, and from the claims.

DETAILED DESCRIPTION

Examples described in this disclosure relate to techniques applied by a computing device that receives an indication of user input at a presence-sensitive input device (e.g., display, screen, etc.), when the computing device outputs for display, a graphical user interface including a graphical representation of a clock. The computing device may configure the clock of the graphical user interface to act as a graphical time selector for inputting a time entry based on a single gesture input detected by the presence-sensitive input device. One or more of the techniques described herein may enable the computing device to determine at least one time entry per each gesture entered at the presence-sensitive input device.

In some implementations, the graphical representation of the clock may include multiple regions and a course set of time increments, for example, hour and/or half hour times of day. In response to receiving an indication of a single input (e.g., a gesture) at a portion of the presence-sensitive screen corresponding to a location at which one of the clock regions is displayed, the computing device may determine one of the course increments of time and output, for display, a finer set of time increments proximate to the clock region. For example, the fine set of time increments may represent five minute time increments before and/or after the determined course increment of time. Prior to detecting an end of the single gesture input, the computing device may determine a selected one of the finer time increments. Based on the determined one of the course set of time increments and the selected one of the finer set of time increments, the computing device may determine a time entry, such as a time of day. In this way, the computing device may determine a time entry based on a single input at the presence-sensitive input device.

In accordance with techniques of the disclosure, rather than utilize time selectors that require multiple user inputs or multiple user gestures for a single time entry, the computing device may output a graphical time selector by which the computing device receives an indication of a time entry based on a single gesture input. This may allow a user of the computing device to input time entries faster than conventional techniques, and the computing device may process input of time entries more efficiently. That is, by determining a time based on a single gesture input, the computing device may execute fewer operations and/or instructions than other computing devices that have graphical time selectors configured to receive multiple gestures for a single time entry input. By performing fewer operations, the computing device may potentially operate more efficiently and consume less electrical power.

Figure 1:
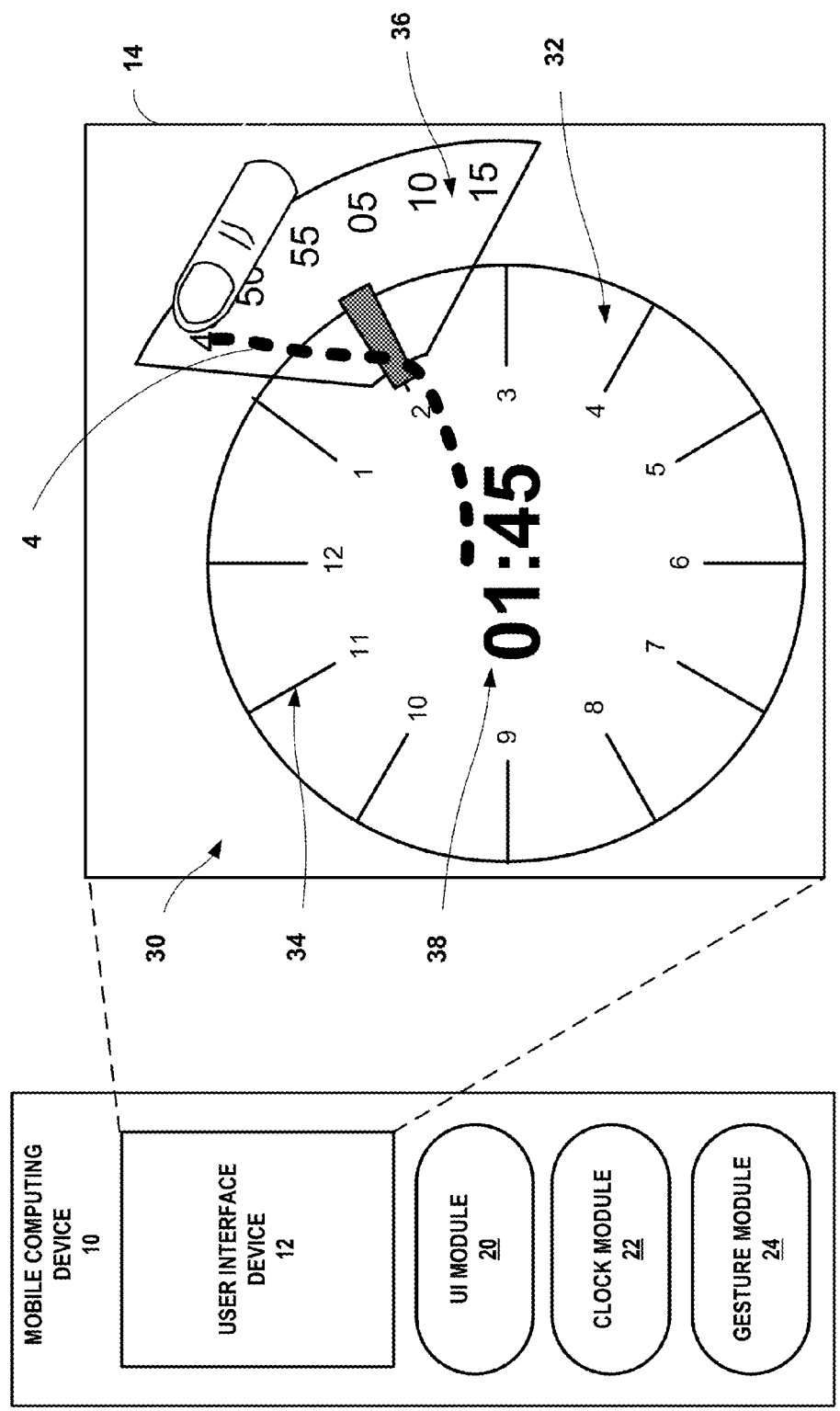
FIG. 1 is a conceptual diagram illustrating an example computing device that is configured to output for display at a user interface device, a graphical time selector as part of a graphical user interface, in accordance with one or more aspects of the present disclosure.

FIG. 1 is a conceptual diagram illustrating one example computing device 10 that is configured to output for display at user interface device 12 (e.g., a presence-sensitive screen operatively coupled to the computing device), a graphical time selector 30 as part of a graphical user interface 14, in accordance with one or more aspects of the present disclosure. In the example of FIG. 1, computing device 10 is a mobile phone. However, in other examples, computing device 10 may be a tablet computer, a personal digital assistant (PDA), a laptop computer, a tabletop computer, a portable gaming device, a portable media player, an e-book reader, a watch, or another type of computing device.

Although discussed below with respect to a computing device that receives an indication of input at a presence-sensitive screen and outputs for display to a presence-sensitive screen, the use of a presence-sensitive screen for either input or output should not be construed to be in any way limiting. For instance, in some examples, rather than receiving an indication of a user input from a presence-sensitive screen, the computing device receives the user input from a track pad, a depth camera, or other presence-sensitive input device. In some examples, rather than output for display to a presence-sensitive screen, the computing device 10 outputs for display to a projector, a monitor, or other display device and/or screen.

As shown in FIG. 1, computing device 10 includes a user interface device ("UID") 12. UID 12 of computing device 10 may function as an input device for computing device 10 and additionally, in some instances, as an output device. UID 12 may be implemented using various technologies. For instance, UID 12 may function as an input device using a resistive touchscreen, a surface acoustic wave touchscreen, a capacitive touchscreen, a projective capacitance touchscreen, a pressure-sensitive screen, an acoustic pulse recognition touchscreen, or another presence-sensitive screen technology. UID 12 may function as an output device using any one or more of a liquid crystal display (LCD), dot matrix display, light emitting diode (LED) display, organic light-emitting diode (OLED) display, e-ink, or similar monochrome or color display capable of outputting visible information to the user of computing device 10.

For purposes of illustration only, when describing UID 12, it is assumed in the example of FIG. 1 that UID 12 includes a presence-sensitive screen that can receive tactile user input from a user of computing device 10. UID 12 may receive the tactile user input by detecting one or more tap gestures and/or non-tap gestures from a user of computing device 10 (e.g., the user touching or pointing to one or more locations of UID 12 with a finger or a stylus pen). The presence-sensitive screen of UID 12 can also present output to a user. UID 12 may present the output as a user interface (e.g., user interface 14) which may be related to functionality provided by computing device 10. For example, UID 12 may present various functions and applications executing on computing device 10 such as a calendar application, an electronic message application, and an Internet browser application.

Computing device 10 may include user interface ("UI") module 20, clock module 22, and gesture module 24. Modules 20, 22, and 24 may perform operations described herein using software, hardware, firmware, or a mixture of hardware, software, and firmware residing in and executing on computing device 10. Computing device 10 may execute modules 20, 22, and 24 with one or more processors. In some examples, computing device 10 may execute modules 20, 22, and 24 as a virtual machine executing on underlying hardware.

UI module 20 may receive data from applications executing at computing device 10 and modules such as clock module 22 and process the received data into a user interface (e.g., user interface 14), including graphical elements, for display at the presence-sensitive screen of UID 12. FIG. 1 illustrates UI module 20 causing UID 12 to present user interface 14. User interface 14 includes graphical elements displayed at various locations of UID 12. FIG. 1 illustrates clock 30 having regions 32 and first time increments 34 as part of user interface 14.

Clock module 22 represents an application and/or module executing at computing device 10 to manage output of a graphical time selector and process input related to the graphical time selector. For instance, UI module 20 may receive instructions from clock module 22 that relate to command and control of clock 30 when UI module 20 includes clock 30 within user interface 14. Clock module 22 may interpret data generated by gesture module 24 that relates to an input received at a location of a presence-sensitive screen of UID 12 that presents clock 30. Based on an interpretation of data received from gesture module 24, clock module 22 may generate commands for UI module 20 that cause UI module 20 to modifying user interface 14.

Clock 30 is a graphical representation of a clock output for display and provides a graphical time selector for receiving a time entry from a user as part of an application (e.g., a calendar application, an Internet browsing application, text-editing application, etc.) or operating system executing at computing device 10. In this example, clock 30 includes graphical elements displayed as features of an analog clock. Different regions 32 of the graphical representation of clock 30 are associated with different durations of time. For instance, regions 32 of clock 30 may represent equal divisions of clock 30 that are each associated with different hour long durations of time (e.g., twelve, twenty-four, etc. divisions to represent twelve or twenty-four hour divisions of a day). One o'clock and two o'clock may bound one of regions 32, two o'clock and three o'clock may bound a different one of regions 32, etc. Although described below with respect to hour long durations of time, regions 32 may be graphical regions that are associated with durations of time greater than or less than a single hour. For instance, regions 32 may be associated with minutes or multi-hour durations of time.

In this example, clock 30 includes a first set of time increments 34, also referred to herein a set of course time increments 34. Time increments 34 bound and/or segregate each of regions 32 into individual time durations. FIG. 1 illustrates time increments 34 as one hour increments of time. Although illustrated as one hour increments of time, in some examples, time increments 34 may be one day increments of time, one hour increments of time, one half hour increments of time one minute increments of time, one second increments of time, or larger or smaller increments of time. That is, time increments 34 may represent time increments greater than or less than single hours, such as, one half hour time increments, minute time increments, etc.

As shown in FIG. 1, clock 30 also includes a second set of time increments 36, also referred to herein as a set of finer time increments. Time increments 36 may represent intervals of time within a single one of regions 32 or adjacent ones of regions 32. Time increments 36 may, for example, be one minute increments of time, five minute increments of time, ten minute increments of time, fifteen minute increments of time or other exemplary increments of time that are less than the duration of each of the first set of time increments 34. Each of time increments 36 may, for example, be a fractional value of each of time increments 34. In this way, time increments 36 are of finer-grain time increments than time increments 34. For example, while each of time increments 34 may represent a one hour time increment, each of time increments 36 may represent a fraction of one hour time increment. In some examples, UID 12 may present time increments 36 at the presence-sensitive screen at an area outside of clock 30 and proximate to a selected one of time increments 34. In other examples, UID 12 may present time increments 36 at the presence-sensitive screen within one of regions 32. FIG. 1 illustrates six time increments 36 that represent fifteen, ten, and five minute increments before and after the two o'clock time increment 34.

In the example of FIG. 1, clock module 22 outputs clock 30 to present a determined time 38 near a center portion of clock 30. That is, as described below, determined time 38 represents a time entry output from the graphical time selector, as determined by clock module 22. Determined time 38 may represent any particular time of day or amount of time having a single field or multiple fields for individual units of time. For instance, determined time 38 may represent a unit of time in multiples or fractions of hours, minutes, and seconds and may further include one or more fields for a calendar day or label of a day of a week.

Gesture module 24 of computing device 10 may receive, from UID 12, an indication of user input entered at a presence-sensitive screen of UID 12 and process the indication of the user input into data that gesture module 24 shares with UI module 20, clock module 22, and other applications and/or modules executing at computing device 10. Gesture module 24 may, for example, be a component of an operating system executing at computing device 10. Each time UID 12 receives an indication of user input detected at a location of the presence-sensitive screen, gesture module 24 may receive information about the user input from UID 12. Gesture module 24 may assemble the information received from UID 12 and generate a group of touch events. One or more touch events in the group may include a representation (e.g., data), such as a location associated with UID 12, a time related to when UID 12 received part of a user input at the location, and/or a direction related to whether the touch event represents a lift up, a push down, or a lateral motion at the presence-sensitive screen. Gesture module 24 may transmit the group of touch events to UI module 20 and clock module 22. UI module 20 and clock module 22 may use the data associated with one or more of these touch events to determine an appropriate response to the user input. For example, based on the location components of these touch events, clock module 22 may cause UI module 20 to modify clock 30 and output determined time 38 at the presence-sensitive screen of UID 12.

In accordance with techniques of this disclosure, computing device 10 may output for display (e.g., at a presence-sensitive screen of UID 12), a graphical user interface 14 comprising a clock 30 having regions 32 associated with a first set of time increments 34. A user of computing device 10 may interact with an application (e.g., a calendar) executing at computing device 10. The application may contain an option for inputting a time used by the application in performing a function (e.g., generating an event notice, a meeting invitation, etc.). The application may detect a selection of the option to enter a time and, in response, the application may invoke clock module 22 to output clock 30 and process a receipt of a time entry from the user.

In response to invocation by the application, clock module 22 may send commands and/or data to UI module 20 for outputting user interface 14 including clock 30. For example, UI module 20 may receive an internal data communication or application programming interface (API) call from clock module 22 with instructions to output clock 30. In response to the internal communication from clock module 22, UI module 20 may cause UID 12 to output user interface 14 including clock 30 and time increments 34 at a presence-sensitive screen.

Responsive to receiving an indication of an input 4 at a portion of the presence-sensitive screen of UID 12 corresponding to a location at which one of regions 32 of clock 30 is displayed, computing device 10 may determine one of the first set of time increments 34 and output, for display and proximate to the location, a second set of time increments 36. In other words, as UID 12 outputs user interface 14 at the presence-sensitive screen, UID 12 of computing device 10 may also detect a gesture input 4 at the presence-sensitive screen (e.g., as a user taps or swipes a finger and/or stylus pen across locations of the presence-sensitive screen of UID 12 as illustrated in FIG. 1 with a dashed line segment). In some examples, gesture input 4 is a series of one or more tap gestures. In other cases, gesture input 4 may be one or more non-tap gestures. In any event, gesture module 24 may receive data about gesture input 4 as UID 12 receives gesture input 4. Gesture module 24 may process the data about gesture input 4 into a group of one or more touch events and share the one or more touch events with UI module 20 and clock module 22.

Based on the locations of the one or more touch events, clock module 22 may determine that the touch events represent a gesture at a portion of the presence-sensitive screen of UID 12 at which UID 12 presents one of regions 32 of clock 30 (e.g., the one o'clock to two o'clock region of regions 32).

Clock module 22 may further determine that the locations of the one or more touch events represent a gesture at a portion of the presence-sensitive screen of UID 12 closest to where UID 12 presents a single one of time increments 34 (e.g., the two o'clock time increment of time increments 34). For instance, in addition to receiving the touch event data from gesture module 24, clock module 22 may receive data from UI module 20 about the locations of the presence-sensitive screen where UID 12 presents regions 32 and time increments 34. Clock module 22 may compare the locations of the touch events with the locations of regions 32 and the locations of time increments 34. Clock module 22 may determine the one of regions 32 and the one of time increments 34 with locations closest (e.g., shortest distance) to the locations of the touch events based on gesture 4. As shown in the example of FIG. 1, clock module 22 may determine the touch events represent a selection of the two o'clock time increment of time increments 34.

In response to identifying a selection of the two o'clock time increment of time increments 34, clock module 22 may send a display command to UI module 20 with instructions to output time increments 36. UI module 20 may receive the instructions from clock 22 and cause UID 12 to output, for display at the presence-sensitive screen time increments 36 proximate to (i.e., near) the two o'clock time increment of time increments 34. UI module 20 may share location data about where UID presents time increments 36 at the presence-sensitive screen with clock module 22.

Computing device 10 may determine a time entry, e.g., a current time of day, based on the determined one of the first set of time increments 34 and a selected one of the second time increments 36, which may each be selected in response to an indication of a single gesture. For example, after clock module 22 sends instructions to UI module 20 that commands UI module 20 to cause UID 12 to output time increments 36 at the presence-sensitive screen and at a location near the two o'clock time increment of time increments 34, clock module 22 may receive additional touch events from gesture module 24. Gesture module 24 may generate the additional touch events while continuing to receive the indication of the gesture input 4. In other words, clock module 22 may receive additional touch events from gesture module 24 and data about where UID 12 presents time increments 36 at the presence-sensitive screen.

Clock module 22 may determine a selected one of time increments 36 by comparing the location data of time increments 36 received from UI module 20 with the locations of the additional touch events. The selected one of time increments 36 may correspond to one of time increments 36 having a location nearest the additional touch events. For example, the locations of the additional touch events may share a shorter distance to forty-five minute (e.g., fifteen minutes before two o'clock) time increment of increments 36 than each of the other increments 36. Clock module 22 may determine the forty-five minute time increment of time increments 36 represents the selected one of time increments 36.

In this example, the selected one of time increments 36 is based on additional touch events generated from the gesture input 4 received at the presence-sensitive screen of UID 12. In other examples, clock module 22 may determine the selected one of time increments 36 from the original touch events received from gesture module 24. For instance, if subsequent to commanding UI module 20 to output time increments 36, clock module 22 does not receive additional touch events from gesture module 24 or if none of the locations of the additional touch events shares a shortest distance with one of time increments 36, clock module 22 may determine a selection of none of time increments 36.

In any event, clock module 22 may determine a time entry based on the determined one of time increments 34 and the selected one of time increments 36. In this example, clock module 22 may determine the time entry by a combination of the selected one of time increments 34 (e.g., two o'clock) and the selected one of time increments 36 (e.g., negative fifteen minutes). Clock module 22 may determine forty-five minutes past one o'clock represents the time based on gesture input 4.

Computing device 10 may output the determined time 38 for display. For example, after determining the time based on the user input, clock module 22 may transmit the data about the time to UI module 20 with instructions for outputting the time as determined time 38 of FIG. 1. UI module 20 may cause UID 12 to output determined time 38 at the presence-sensitive screen. In some examples, in addition to, or alternative to causing UI module 20 to output determined time 38 at the presence-sensitive screen, clock module 22 may output determined time 38 to one or more applications. For instance, clock module 22 may output determined time 38 to the application that invoked clock module 22. The invoking application may receive determined time 38 from clock module 22 and utilize determined time 38 in performing a function, such as generating a calendar appointment.

Applications and/or modules executing at computing device 10 that invoke clock module 22 and utilize a graphical time selector according to techniques of this disclosure, may more quickly and efficiently receive time entries from a user, than applications and/or modules that use different graphical time selectors. For instance, by use of the graphical time selector according to techniques of this disclosure, applications or other software executing at computing device 10 can receive and determine a complete time entry based on a single gesture received at a presence-sensitive screen. Unlike graphical time selectors that require multiple taps and non-tap gestures to input a time, computing device 10 that uses a graphical time selector according to techniques of this disclosure may potentially receive time entries quicker and/or perform fewer operations unnecessarily processing extra user inputs to input a single time entry. Consequently, by performing fewer operations, computing device 10 may operate more efficiently and consume less electrical power than other computing devices.

Figure 2:
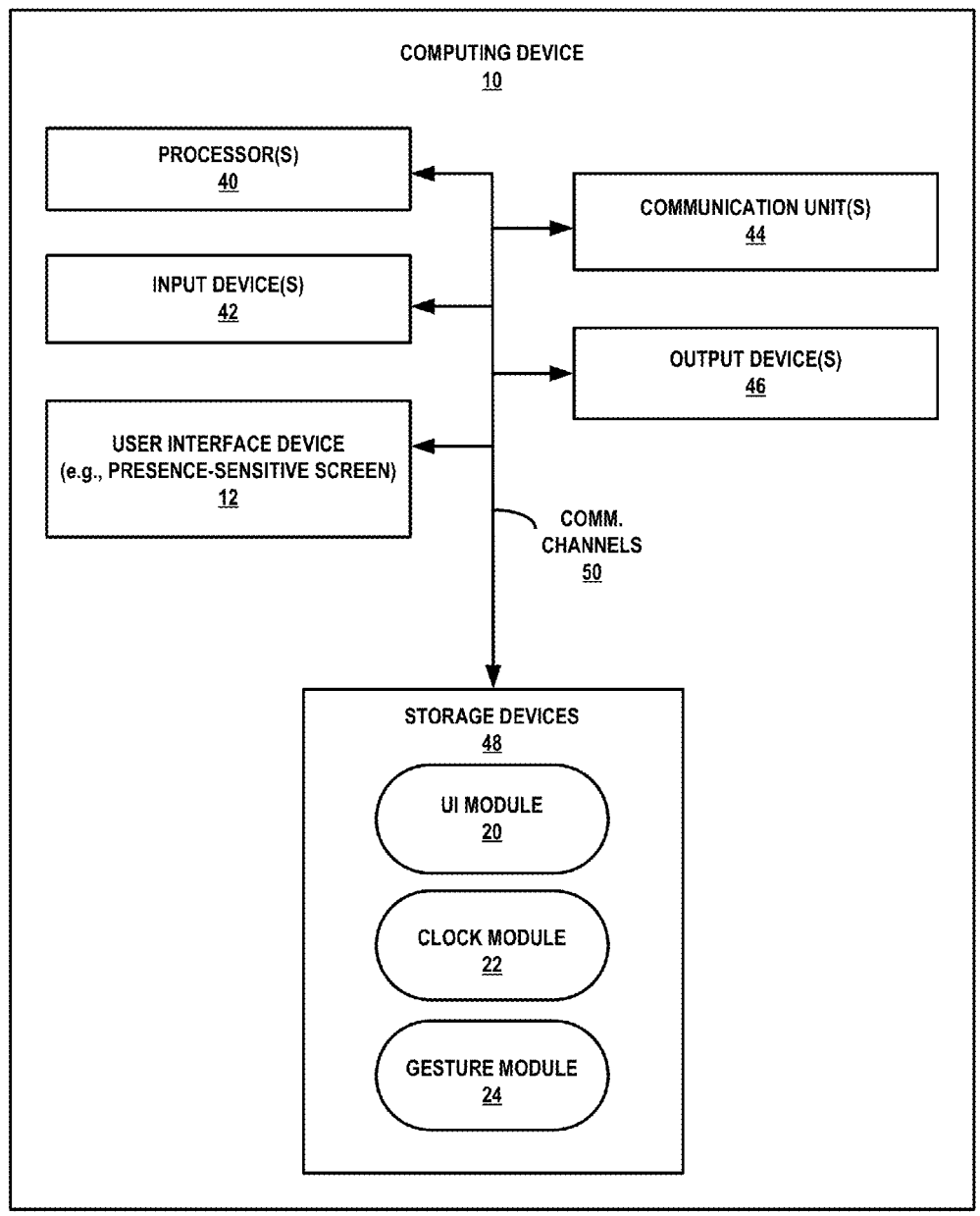
FIG. 2 is a block diagram illustrating an example computing device, in accordance with one or more aspects of the present disclosure.

FIG. 2 is a block diagram illustrating an example computing device, in accordance with one or more aspects of the present disclosure. Computing device 10 of FIG. 2 is described below within the context of FIG. 1. FIG. 2 illustrates only one particular example of computing device 10, and many other examples of computing device 10 may be used in other instances and may include a subset of the components included in example computing device 10 or may include additional components not shown in FIG. 2. Although shown in FIGS. 1 and 2 as a stand-alone computing device for purposes of example, computing device 10 may be any component or system that includes one or more processors (e.g., one or more processors 40) or other suitable computing environment for executing software instructions and, for example, need not necessarily include one or more of the elements shown in these figures (e.g., UI device 12, input devices 42, output devices 46).

As shown in the example of FIG. 2, computing device 10 includes user interface device 12 ("UID 12"), one or more processors 40, one or more input devices 42, one or more communication units 44, one or more output devices 46, and one or more storage devices 48. Storage devices 48 of computing device 10 also include UI module 20, clock module 22, and gesture module 24. Communication channels 50 may interconnect each of the components 12, 20, 22, 24, 40, 42, 44, and 46 for inter-component communications (physically, communicatively, and/or operatively). In some examples, communication channels 50 may include a system bus, a network connection, an inter-process communication data structure, or any other method for communicating data.

One or more input devices 42 of computing device 10 may receive input. Examples of input are tactile, audio, and video input. Input devices 42 of computing device 10, in one example, includes a presence-sensitive screen, touch-sensitive screen, mouse, keyboard, voice responsive system, video camera, microphone or any other type of device for detecting input from a human or machine.

One or more output devices 46 of computing device 10 may generate output. Examples of output are tactile, audio, and video output. Output devices 46 of computing device 10, in one example, includes a presence-sensitive screen, sound card, video graphics adapter card, speaker, cathode ray tube (CRT) monitor, liquid crystal display (LCD), or any other type of device for generating output to a human or machine.

One or more communication units 44 of computing device 10 may communicate with external devices via one or more networks by transmitting and/or receiving network signals on the one or more networks. For example, computing device 10 may use communication unit 44 to transmit and/or receive radio signals on a radio network such as a cellular radio network. Likewise, communication units 44 may transmit and/or receive satellite signals on a satellite network such as a GPS network. Examples of communication unit 44 include a network interface card (e.g. such as an Ethernet card), an optical transceiver, a radio frequency transceiver, a GPS receiver, or any other type of device that can send and/or receive information. Other examples of communication units 44 may include Bluetooth®, GPS, 3G, 4G, and Wi-Fi® radios found in mobile devices as well as Universal Serial Bus (USB) controllers.

In some examples, UID 12 of computing device 10 may include functionality of input devices 42 and/or output devices 46. In the example of FIG. 2, UID 12 may be or may include a presence-sensitive screen. In some examples, a presence-sensitive screen may detect an object at and/or near the presence-sensitive screen. As one example range, a presence-sensitive screen may detect an object, such as a finger or stylus that is within two inches or less of the presence-sensitive screen. The presence-sensitive screen may determine a location (e.g., an (x,y) coordinate) of the presence-sensitive screen at which the object was detected. In another example range, a presence-sensitive screen may detect an object six inches or less from the presence-sensitive screen and other exemplary ranges are also possible. The presence-sensitive screen may determine the location of the screen selected by a user's finger using capacitive, inductive, and/or optical recognition techniques. In some examples, presence-sensitive screen provides output to a user using tactile, audio, or video stimuli as described with respect to output device 46. In the example of FIG. 2, UID 12 presents a user interface (such as user interface 14 of FIG. 1), and other various functions and applications executing on computing device 10 at the presence-sensitive screen of UID 12.

While illustrated as an internal component of computing device 10, UID 12 also represents and external component that shares a data path with computing device 10 for transmitting and/or receiving input and output. For instance, in one example, UID 12 represents a built-in component of computing device 10 located within and physically connected to the external packaging of computing device 10 (e.g., a screen on a mobile phone). In another example, UID 12 represents an external component of computing device 10 located outside and physically separated from the packaging of computing device 10 (e.g., a monitor or a projector that shares a wired and/or wireless data path with a tablet computer).

One or more storage devices 48 within computing device 10 may store information for processing during operation of computing device 10 (e.g., instructions and/or data associated with UI module 20, clock module 22, and gesture module 24). In some examples, storage device 48 is a temporary memory, meaning that a primary purpose of storage device 48 is not long-term storage. Storage devices 48 on computing device 10 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with UI module 20, clock module 22, and gesture module 24.

One or more processors 40 may implement functionality and/or execute instructions within computing device 10. For example, processors 40 on computing device 10 may receive and execute instructions stored by storage devices 48 that execute the functionality of UI module 20, clock module 22, and gesture module 24. These instructions executed by processors 40 may cause computing device 10 to store information, within storage devices 48 during program execution. Processors 40 may execute instructions of modules 20-24 to cause UID 12 to display user interface 14 with a graphical representation of clock 30 at the presence-sensitive screen of UID 12. That is, modules 20-24 may be operable by processors 40 to perform various actions, including receiving user input entered at locations of the presence-sensitive screen of UID 12 and causing UID 12 to present user interface 14 at the presence-sensitive screen of UID 12.

In accordance with aspects of this disclosure computing device 10 of FIG. 2 may output for display at presence-sensitive screen 12, a graphical user interface 14 comprising a clock 30 having regions 32 associated with a first set of time increments 34. For example, a user of computing device 10 may interact with an application (e.g., a calendar) executing at computing device 10. The application may contain an option for inputting a time used by the application in performing a function (e.g., generating an event notice, a meeting invitation, etc.). The application may detect a selection of the option to enter a time and, in response, the application may invoke clock module 22 to output clock 30 and process a receipt of a time entry from the user.

In response to invocation by the application, clock module 22 may send commands and/or data over communication channels 50 to UI module 20 for outputting user interface 14 including clock 30. For example, UI module 20 may receive an internal data communication or application programming interface (API) call from clock module 22 over communication channels 50 with instructions to output clock 30. In response to the internal communication from clock module 22, UI module 20 may cause presence-sensitive screen 12 to output user interface 14 including clock 30 and time increments 34.

Responsive to receiving an indication of an input (e.g. gesture input 4) at a portion of presence-sensitive screen 12 at which one of regions 32 of clock 30 is displayed, computing device 10 may determine one of the first set of time increments 34 and output, for display at presence-sensitive screen 12 and proximate to the portion of the presence-sensitive screen 12, a second set of time increments 36. In other words, as presence-sensitive screen 12 presents user interface 14, presence-sensitive screen 12 may also detect gesture input 4. In response to the indication of gesture input 4, presence-sensitive screen 12 may transmit information about gesture input 4 over communication channels 50 to gesture module 24. Gesture module 24 may receive the information from presence-sensitive screen 12 and define a group of touch events based on the information. Gesture module 24 may process the data about gesture input 4 into a group of one or more touch events. Each touch event in the group of touch events may include a direction component, a location component, and a time component. In other words, each touch event may include data that represents from what direction presence-sensitive screen 12 received part or all of gesture input 4, where at presence-sensitive screen 12 part or all of gesture input 4 was received, and when presence-sensitive screen 12 received part or all of gesture input 4. Gesture module 24 may share the one or more touch events with UI module 20 and clock module 22 by transmitting the one or more touch events to one or both modules 20,22 over communication channels 50.

Clock module 22 may receive the one or more touch events over communication channels 50 from gesture module 24. Based on the location data of the one or more touch events, clock module 22 may determine that the touch events represent an indication of a gesture received at a portion of presence-sensitive screen 12 at where presence-sensitive screen 12 presents one of regions 32 of clock 30 (e.g., the one o'clock to two o'clock region of regions 32). Clock module 22 may further determine that the locations of the one or more touch events represent a gesture at a portion of presence-sensitive screen 12 closest to where presence-sensitive screen 12 presents a single one of time increments 34 (e.g., the two o'clock time increment of time increments 34). For instance, in addition to receiving the touch event data from gesture module 24, clock module 22 may receive data from UI module 20 over communication channels 50 about locations at presence-sensitive screen 12 where regions 32 and time increments 34 are presented. Clock module 22 may compare the locations of the touch events with the locations of regions 32 and the locations of time increments 34. Clock module 22 may determine the one of regions 32 and the one of time increments 34 with a location nearest to the locations gesture 4. As shown in the example of FIG. 1, clock module 22 may determine the touch events represent a selection of the two o'clock time increment of time increments 34.

In response to identifying a selection of the two o'clock time increment of time increments 34, clock module 22 may send a display command to UI module 20 with instructions to output time increments 36. For instance, clock module 22 may send the display command over communication channels 50 to modify the output of graphical user interface 14 at presence-sensitive screen 12. UI module 20 may receive the display command and instructions from clock module 22 and cause presence-sensitive screen 12 to present time increments 36 proximate to (i.e., near) the two o'clock time increment of time increments 34. UI module 20 may share location data about where presence-sensitive screen 12 presents time increments 36 with clock module 22.

Computing device 10 may determine a time entry, e.g., a current time of day, based on the determined one of the first set of time increments 34 and a selected one of the second set of time increments 36, which may each be selected in response to an indication of a single gesture. For example, after clock module 22 sends instructions to UI module 20 over communication channels 50 that command UI module 20 to cause presence-sensitive screen 12 to present time increments 36 at a location near the two o'clock time increment of time increments 34, clock module 22 may receive additional touch events from gesture module 24 about the indication of gesture input 4. Gesture module 24 may generate the additional touch events while continuing to receive the indication of the gesture input 4 from presence-sensitive screen 12. In other words, clock module 22 may receive additional touch events about gesture input 4 from gesture module 24 while presence-sensitive screen 12 presents time increments 36.

Clock module 22 may determine a selected one of time increments 36 by comparing the location data of time increments 36 received from UI module 20 with the locations of the additional touch events received from gesture module 24. The selected one of time increments 36 may correspond to one of time increments 36 having a location nearest the additional touch events. For example, the locations of the additional touch events may share a shorter distance to forty-five minute (e.g., fifteen minutes before two o'clock) time increment of increments 36 than each of the other increments 36. Clock module 22 may determine the forty-five minute time increment of time increments 36 represents the selected one of time increments 36.

Clock module 22 may determine a time entry based on the determined one of time increments 34 and the selected one of time increments 36. In this example, clock module 22 may determine the time entry by a combination of the selected one of time increments 34 (e.g., two o'clock) and the selected one of time increments 36 (e.g., negative fifteen minutes). Clock module 22 may determine forty-five minutes past one o'clock represents the time based on gesture input 4.

Computing device 10 may output the determined time for display. For example, after determining the time based on the user input, clock module 22 may transmit the data about the time (over communication channels 50) to UI module 20 with instructions for outputting the time as determined time 38 of FIG. 1. UI module 20 may receive the time and instructions from clock module 22 and cause presence-sensitive screen 12 to output determined time 38 for display at presence-sensitive screen 12.

In some examples, clock module 22 may share the determined time with the application that invoked clock module 22 or any other application executing at computing device 10. For example, clock module 22 may output determined time 38 over communication channels 50 to the invoking application. The invoking application may receive determined time 38 from clock module 22 and utilize determined time 38 in performing a function, such as generating a calendar appointment.

Applications and/or modules executing at computing device 10 that invoke clock module 22 and utilize a graphical time selector according to techniques of this disclosure, may more quickly and efficiently receive time entries from a user, than applications and/or modules that use different graphical time selectors. Unlike graphical time selectors that require multiple taps and non-tap gestures to input a time, computing device 10, that uses a graphical time selector according to techniques of this disclosure, may potentially receive time entries faster, and perform fewer operations by not processing extra user inputs to input a single time entry. By performing fewer operations, computing device 10 may operate more efficiently and consume less electrical power than other computing devices.

Figure 3:
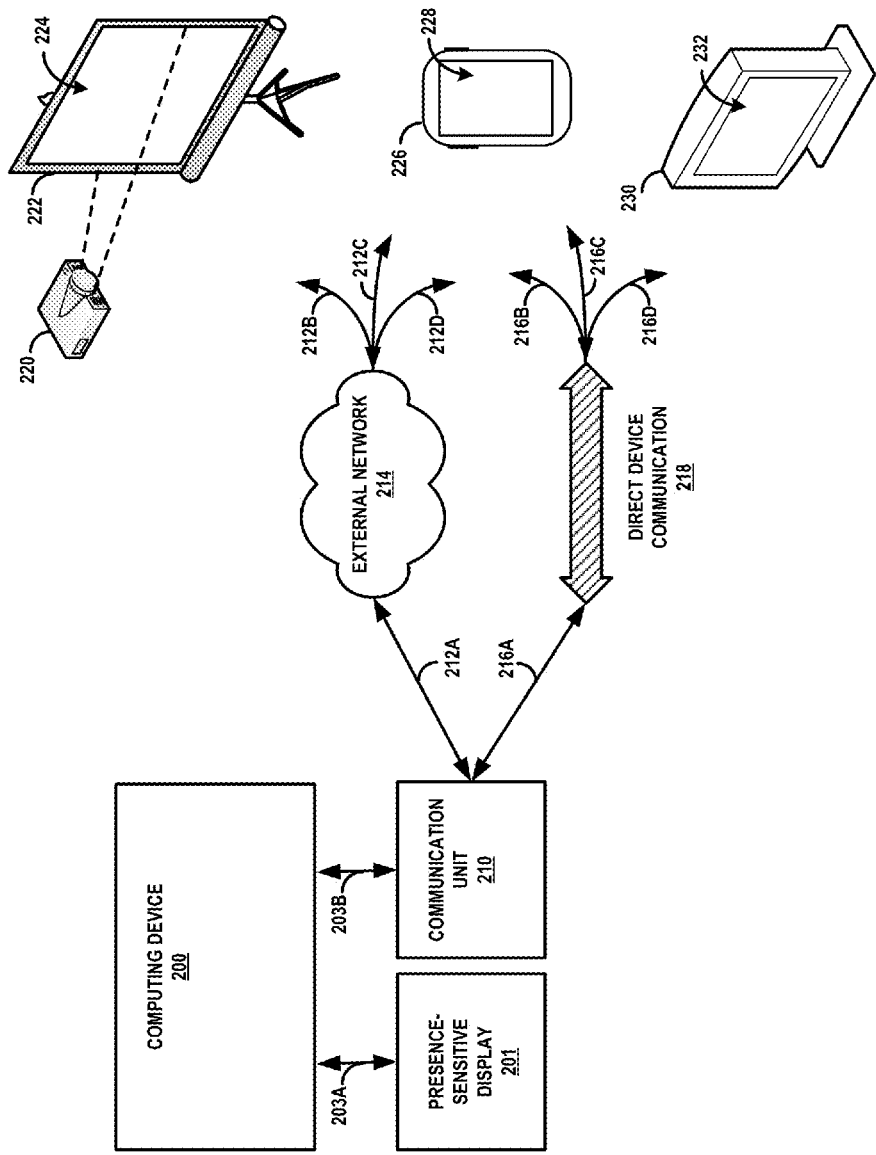
FIG. 3 is a block diagram illustrating an example computing device that outputs graphical content for display at a remote device, in accordance with one or more techniques of the present disclosure.

FIG. 3 is a block diagram illustrating another example computing device that outputs graphical content for display at a remote device operatively coupled to the computing device, in accordance with one or more techniques of the present disclosure. Graphical content, generally, may include any visual information that may be output for display, such as text, images, a group of moving images, etc. The example shown in FIG. 3 includes a computing device 200, presence-sensitive display 201, communication unit 210, projector 220, projector screen 222, tablet device 226, and visual display device 230. Although shown for purposes of example in FIGS. 1 and 2 as a stand-alone computing device 10, a computing-device, such as computing device 10 and computing device 200, may, generally, be any component or system that includes a processor or other suitable computing environment for executing software instructions and, for example, need not include a presence-sensitive display. For purposes of illustration, computing device 200 is described below within the context of computing device 10 in FIGS. 1 and 2.

As shown in the example of FIG. 3, computing device 200 may be a processor that includes functionality as described with respect to processor 40 in FIG. 2. In such examples, computing device 200 may be operatively coupled to presence-sensitive display 201 by a communication channel 203A, which may be a system bus or other suitable connection. Computing device 200 may also be operatively coupled to I/O devices 210, further described below, by a communication channel 203B, which may also be a system bus or other suitable connection. Although shown separately as an example in FIG. 3, computing device 200 may be operatively coupled to presence-sensitive display 201 and I/O devices 210 by any number of one or more communication channels.

In other examples, such as illustrated previously in FIGS. 1-2, computing device 200 may be a portable or mobile device such as mobile phones (including smart phones), laptop computers, etc. In some examples, computing device 200 may be a desktop computers, tablet computers, smart television platforms, cameras, personal digital assistants (PDAs), servers, mainframes, etc.

As shown in FIG. 3, computing device 200 may also include and/or be operatively coupled with communication unit 210. Communication unit 210 may include functionality of communication unit 44 as described in FIG. 2. Examples of communication unit 210 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 200 may also include and/or be operatively coupled with one or more other devices, e.g., input devices, output devices, memory, storage devices, etc. that are not shown in FIG. 3 for purposes of brevity and illustration.

FIG. 3 also illustrates a projector 220 and projector screen 222. Other such examples of projection devices may include electronic whiteboards, holographic display devices, and any other suitable devices for displaying graphical content. Projector 220 and project screen 222 may include one or more communication units that enable the respective devices to communicate with computing device 200. In some examples, the one or more communication units may enable communication between projector 220 and projector screen 222. Projector 220 may receive data from computing device 200 that includes graphical content. Projector 220, in response to receiving the data, may project the graphical content onto projector screen 222. In some examples, projector 220 may determine one or more user inputs (e.g., continuous gestures, multi-touch gestures, single-touch gestures, etc.) at projector screen using optical recognition or other suitable techniques and send indications of such user input using one or more communication units to computing device 200.

Projector screen 222, in some examples, may include a presence-sensitive display 224. Presence-sensitive display 224 may include a subset of functionality or all of the functionality of UID 12 as described in this disclosure. In some examples, presence-sensitive display 224 may include additional functionality. Projector screen 222 (e.g., an electronic whiteboard), may receive data from computing device 200 and display the graphical content. In some examples, presence-sensitive display 224 may determine one or more user inputs (e.g., continuous gestures, multi-touch gestures, single-touch gestures, etc.) at projector screen 222 using capacitive, inductive, and/or optical recognition techniques and send indications of such user input using one or more communication units to computing device 200.

FIG. 3 also illustrates tablet device 226 and visual display device 230. Tablet device 226 and visual display device 230 may each include computing and connectivity capabilities. Examples of tablet device 226 may include e-reader devices, convertible notebook devices, hybrid slate devices, etc. Examples of visual display device 230 may include televisions, computer monitors, etc. As shown in FIG. 3, tablet device 226 may include a presence-sensitive display 228. Visual display device 230 may include a presence-sensitive display 232. Presence-sensitive displays 228, 232 may include a subset of functionality or all of the functionality of UID 12 as described in this disclosure. In some examples, presence-sensitive displays 228, 232 may include additional functionality. In any case, presence-sensitive display 232, for example, may receive data from computing device 200 and display the graphical content. In some examples, presence-sensitive display 232 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 200.

As described above, in some examples, computing device 200 may output graphical content for display at presence-sensitive display 201 that is coupled to computing device 200 by a system bus or other suitable communication channel. Computing device 200 may also output graphical content for display at one or more remote devices, such as projector 220, projector screen 222, tablet device 226, and visual display device 230. For instance, computing device 200 may execute one or more instructions to generate and/or modify graphical content in accordance with techniques of the present disclosure. Computing device 200 may output the data that includes the graphical content to a communication unit of computing device 200, such as communication unit 210. Communication unit 210 may send the data to one or more of the remote devices, such as projector 220, projector screen 222, tablet device 226, and/or visual display device 230. In this way, processor 102 may output the graphical content for display at one or more of the remote devices. In some examples, one or more of the remote devices may output the graphical content at a presence-sensitive display that is included in and/or operatively coupled to the respective remote devices.

In some examples, computing device 200 may not output graphical content at presence-sensitive display 201 that is operatively coupled to computing device 200. In other examples, computing device 200 may output graphical content for display at both a presence-sensitive display 201 that is coupled to computing device 200 by communication channel 203A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 200 and output for display at presence-sensitive display 201 may be different than graphical content display output for display at one or more remote devices.

Computing device 200 may send and receive data using any suitable communication techniques. For example, computing device 200 may be operatively coupled to external network 214 using network link 212A. Each of the remote devices illustrated in FIG. 3 may be operatively coupled to network external network 214 by one of respective network links 212B, 212C, and 212D. External network 214 may include network hubs, network switches, network routers, etc., that are operatively inter-coupled thereby providing for the exchange of information between computing device 200 and the remote devices illustrated in FIG. 3. In some examples, network links 212A-212D may be Ethernet, ATM or other network connections. Such connections may be wireless and/or wired connections.

In some examples, computing device 200 may be operatively coupled to one or more of the remote devices included in FIG. 3 using direct device communication 218. Direct device communication 218 may include communications through which computing device 200 sends and receives data directly with a remote device, using wired or wireless communication. That is, in some examples of direct device communication 218, data sent by computing device 200 may not be forwarded by one or more additional devices before being received at the remote device, and vice-versa. Examples of direct device communication 218 may include Bluetooth, Near-Field Communication, Universal Serial Bus, WiFi, infrared, etc. One or more of the remote devices illustrated in FIG. 3 may be operatively coupled with computing device 200 by communication links 216A-216D. In some examples, communication links 212A-212D may be connections using Bluetooth, Near-Field Communication, Universal Serial Bus, infrared, etc. Such connections may be wireless and/or wired connections.

In accordance with techniques of the disclosure, computing device 200 may be operatively coupled to visual display device 230 using external network 214. Computing device 200 may output graphical user interface 14, that comprises clock 30 having regions 32 associated with time increments 34, for display at presence-sensitive display 232. For instance, computing device 200 may send data that includes a representation of graphical user interface 14 of FIG. 1 to communication unit 210. Communication unit 210 may send the data that includes the representation of graphical user interface 14 to visual display device 230 using external network 214. Visual display device 230, in response to receiving the data using external network 214, may cause presence-sensitive display 232 to output graphical user interface 14. In response to a user performing a gesture at presence-sensitive display 232 (e.g., to select one of time increments 34), visual display device 230 may send an indication of the gesture to computing device 200 using external network 214. Communication unit 210 of may receive the indication of the gesture, and send the indication to computing device 200.

Computing device 200 may determine one of time increments 34 selected by the gesture. In some examples, computing device 200 may determine a distance relative to a location at presence-sensitive display 232 associated with the gesture and a location at presence-sensitive display 232 associated with each of time increments 34. Computing device 200 may determine the selected one of time increments 34 (e.g., by identifying the one of time increments 34 with the shortest distance to the gesture).

In response to the gesture, computing device 200 may modify graphical user interface 14 to include time increments 36, for display at presence-sensitive display 232. For instance, computing device 200 may send data that includes a representation of the modified graphical user interface 14 including time increments 36 to communication unit 210. Communication unit 210 may send the data that includes the representation of the modified graphical user interface 14 to visual display device 230 using external network 214. Visual display device 230, in response to receiving the data using external network 214, may cause presence-sensitive display 232 to update graphical user interface 14 by including time increments 36.

Computing device 200 may determine a time based on the determined one of time increments 36 and a selected one time increments 34. For example, while presence-sensitive display 233 outputs the updated graphical user interface 14, and still in response to the user performing the gesture at presence-sensitive display 232 (e.g., to select one of time increments 34), visual display device 230 may send further indications of the gesture to computing device 200 using external network 214. Communication unit 210 of may receive the further indications of the gesture, and send the further indications to computing device 200.

Computing device 200 may determine one of time increments 36 selected by the gesture. Computing device 200 may determine the selected one of time increments 36 (e.g., by identifying the one of time increments 36 with a shortest distance to the further indications of the gesture). Computing device may determine a time based on the determined one of time increments 34 and the selected one of time increments 36, in accordance with techniques of the disclosure.

FIGS. 4A-4D are conceptual diagrams illustrating example graphical user interfaces, in accordance with one or more aspects of the present disclosure. FIGS. 4A-4D are described below within the context of computing device 10 of FIG. 1 and FIG. 2. Computing device 10 may output user interfaces 60A-60D as shown in the examples of FIGS. 4A-4D for display at presence-sensitive screen 12. For example, a calendar application executing at computing device 10 may invoke clock module 22 of computing device 10 to output user interfaces 60A-60D for entering a start time and an end time associated with a calendar appointment entry.

Figure 4A:
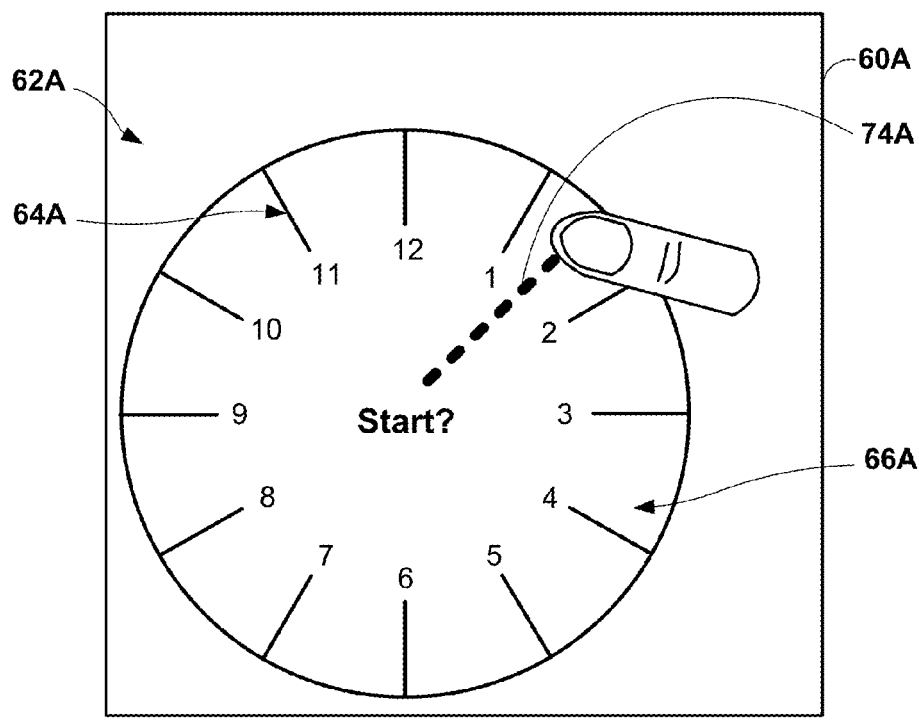
FIGS. 4A-4D are conceptual diagrams illustrating example graphical user interfaces, in accordance with one or more aspects of the present disclosure.

FIG. 4A illustrates user interface 60A that includes a graphical representation of a clock 62A having regions 66A and coarse-grain time increments (e.g., first time increments) 64A as a user of computing device 10 performs gesture 74A at a portion of the presence-sensitive screen at which one of regions 66A of clock 62A is displayed (e.g., the dashed line segment of FIG. 4A illustrates input 74A as a path of gesture). In one example, a calendar application executing at computing device 10 may invoke clock module 22 of computing device 10 to output clock 62A as a time selector for entering a start time and an end time associated with a calendar appointment entry. The user may provide input 74A to enter the start time of the appointment. Computing device 10 may receive an indication of input 74A from which gesture module 24 may determine one or more touch events based on input 74A. From the touch events associated with input 74A, clock module 22 may determine one of coarse-grain time increments 64A (e.g., by determining the one of coarse-grain time increments 64A closest to one or more of the touch events based on input 74A). That is, FIG. 4A illustrates the path of input 74A traversing across a portion of presence-sensitive screen 12 in-between two coarse-grain time increments 64A (e.g., in-between one o'clock and two o'clock). Clock module 22 may determine the one of coarse-grain time increments 64A associated with one o'clock is nearest to the path of input 74A and as such is the determined one of coarse-grain time increments 64A.

Figure 4B:
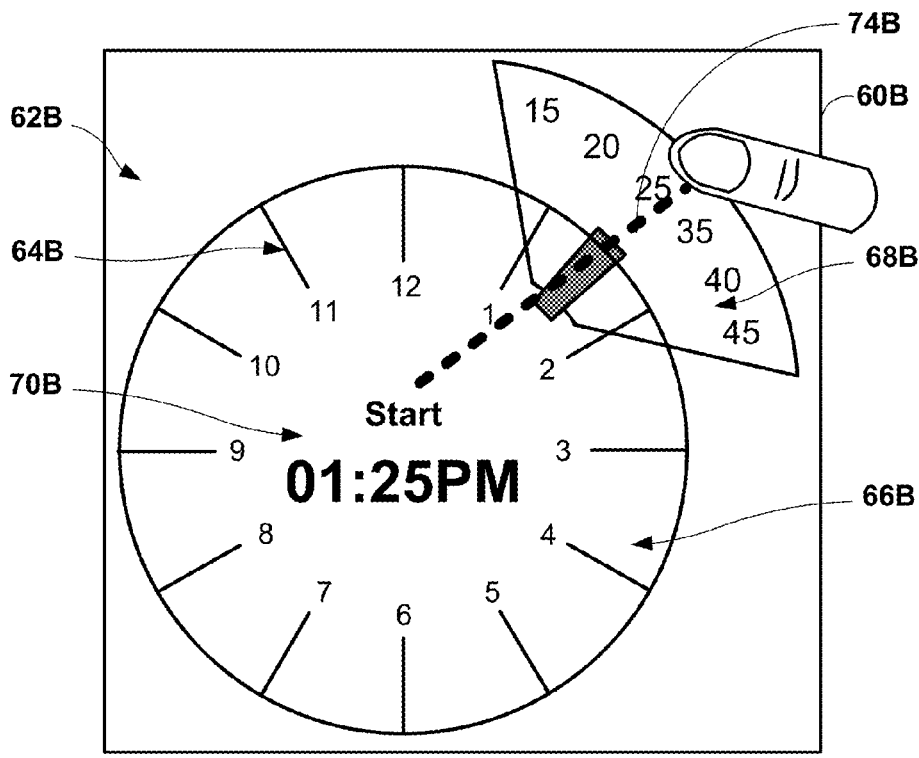

FIG. 4B illustrates user interface 60B that includes a graphical representation of a clock 62B having regions 66B and coarse-grain time increments 64B. Responsive to computing device 10 receiving the indication of input 74A and gesture module 24 determining one or more touch events about input 74A, clock module 22 of computing device 10 may determine one of the coarse set of time increments 64A and command UI module 20 to cause presence-sensitive screen 12 to present a set of fine-grain time increments 68B (e.g., a second set of time increments) proximate to the portion of presence-sensitive screen 12 where the indication of input 74A is received. For example, FIG. 4B illustrates the path of input 74B (which continues along and extends the trajectory of the path of user input 74A from FIG. 4A). The path of input 74B traverses across a portion of presence-sensitive screen 12 in-between two coarse-grain time increments 64B (e.g., one o'clock and two o'clock) and proximate to one fine-grain time increment 68B.

Computing device 10 may determine a time 70B based on the determined one of the set of coarse time increments 64B and a selected one of the set of fine time increments 68B. That is, clock module 22 may receive one or more touch events about input 74B from gesture module 24. Clock module 22 may compare location data of the touch events to locations associated with each of fine-grain time increments 68B. Clock module 22 may determine one of fine-grain time increments 68B nearest the path of input 74B as being a selected one of fine-grain time increments 68B. In the example of FIG. 4B, the selected one of fine-grain time increments 68B corresponds to the one of fine-grain time increments 68B represented by the value twenty-five. In some examples, clock module 22 may combine the determined one of time increments 64B (e.g., one o'clock) with the selected one of time increments 68B (e.g., twenty-five) to determine time 70B (e.g., twenty-five minutes after one o'clock represents the start time of the calendar appointment entry as determined by clock module 22).

In some examples, determined time 70B may be associated with one of AM and PM (i.e., the first twelve hours of a day before noon or the second twelve hours of a day after noon). Clock module 22 may determine which one of AM or PM is associated with determined time 70B. Clock module 22 may output determined time 70B along with a command to output an indication of the one of AM and PM associated with determined time 70B to UI module 20. UI module 20 may cause presence-sensitive screen 12 to output determined time 70B and the indication of one of AM and PM (e.g., the letters "AM" or the letters "PM"). In this example, the start time of the calendar entry determined by clock module 22 corresponds to twenty-five minutes after one o'clock PM and UI module 20 causes presence-sensitive screen 12 to output determined time 70B along with the textual indication of "PM" near the center of the graphical representation of clock 62B.

Although described above as part of a calendar application, determined time 70B should not be limited to a calendar event, for instance, determined time 70B may be associated with any one of a calendar event, a timer setting, a system clock setting, and the like. In other words, clock module 22 may output determined time 70B to any application configured to receive a time from a graphical time selector. A calendar application, an electronic message application, an Internet browser, an operating system settings application, a stop watch application, and a timer application are all example applications that may execute at computing device 10 and may be configured to receive determined time 70B.

Figure 4C:
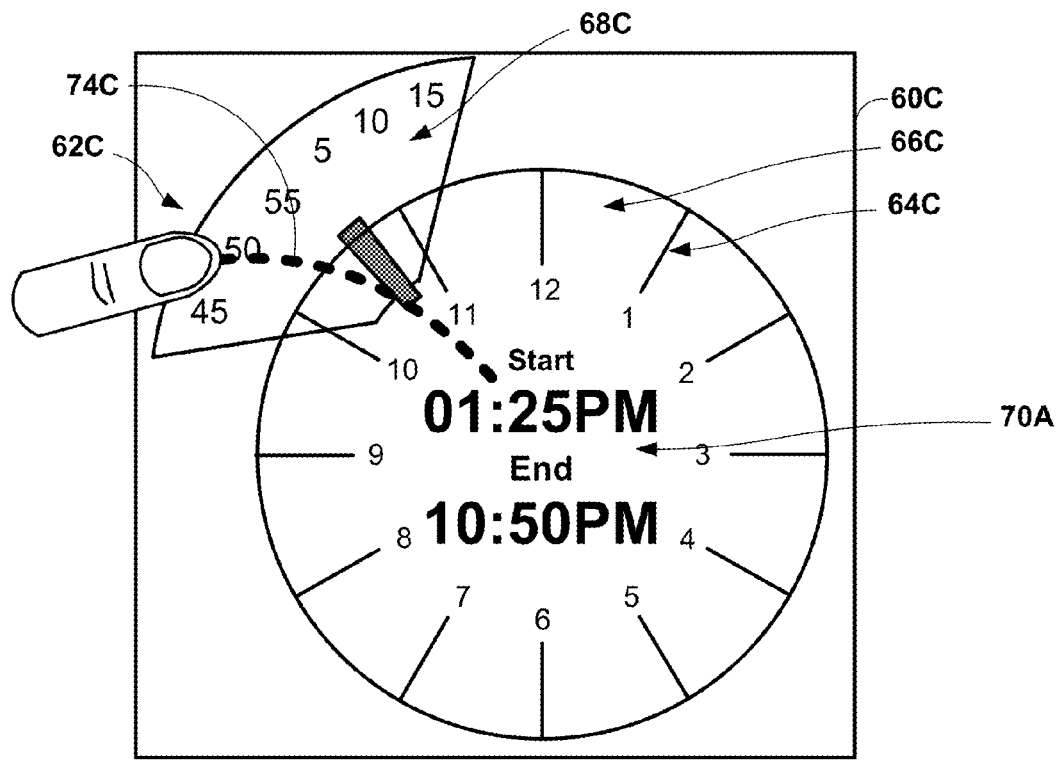

FIG. 4C illustrates a mechanism for entering an end time associated with the calendar appointment entry with that has a start time of twenty-five minutes after one o'clock PM illustrated by FIGS. 4A and 4B. FIG. 4C illustrates user interface 60C that includes a graphical representation of a clock 62C having regions 66C and coarse-grain time increments 64C. After determining the start time associated with the calendar entry, clock module 22 of computing device 10 may determine the end time associated with the calendar entry. For instance, responsive to computing device 10 receiving an indication of input 74C (e.g., a second input detected after the first input 74A, 74B from FIGS. 4A and 4B) and gesture module 24 determining one or more touch events about input 74C, clock module 22 of computing device 10 may determine one of the coarse set of time increments 64C. Clock module 22 may command UI module 20 to cause presence-sensitive screen 12 to present a set of fine-grain time increments 68C (e.g., a second set of time increments) proximate to the portion of presence-sensitive screen 12 where the indication of input 74C is received.

FIG. 4C illustrates the path of input 74C traversing across a portion of presence-sensitive screen 12 in-between two coarse-grain time increments 64C and proximate to one fine-grain time increment 68C. Clock module 22 may determine the one of coarse-grain time increments 64C nearest to the path of input 74C corresponds to the one of coarse-grain time increments 64C represented by eleven o'clock and based on the one of coarse-grain time increments 64C, clock module 22 may command UI module 20 to cause presence-sensitive screen 12 to output fine-grain time increments 68C. The one of fine-grain time increments 68C closest to the path of input 74C corresponds to the one of fine-grain time increments 68C represented by the value fifty. Based on the determined one of coarse-grain time increments 64C and the selected one of fine-grain time increments, clock module 22 may determine the end time of the calendar entry corresponds to fifty minutes past ten o'clock PM.

Figure 4D:
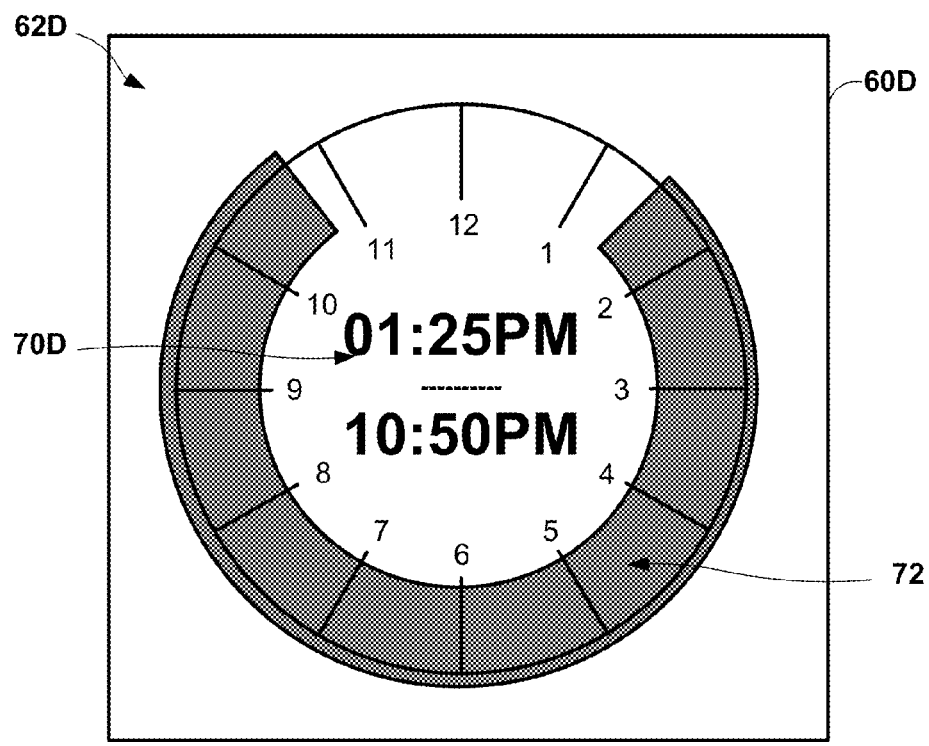

FIG. 4D illustrates user interface 60D having a graphical representation of clock 62D. In the example of FIG. 4D, after determining the start and end times 70D associated with the calendar entry, clock module 22 may command UI module 20 to cause presence-sensitive screen 12 to output for display an indication 72 of determined time 70D at one or more of the regions of clock 62D. In this example, indication 72 is illustrated by a semi-transparent overlay that shades regions of clock 62D between the coarse-grain time increments associated with both the start and end times 70D associated with the calendar entry.

Figure 5A:
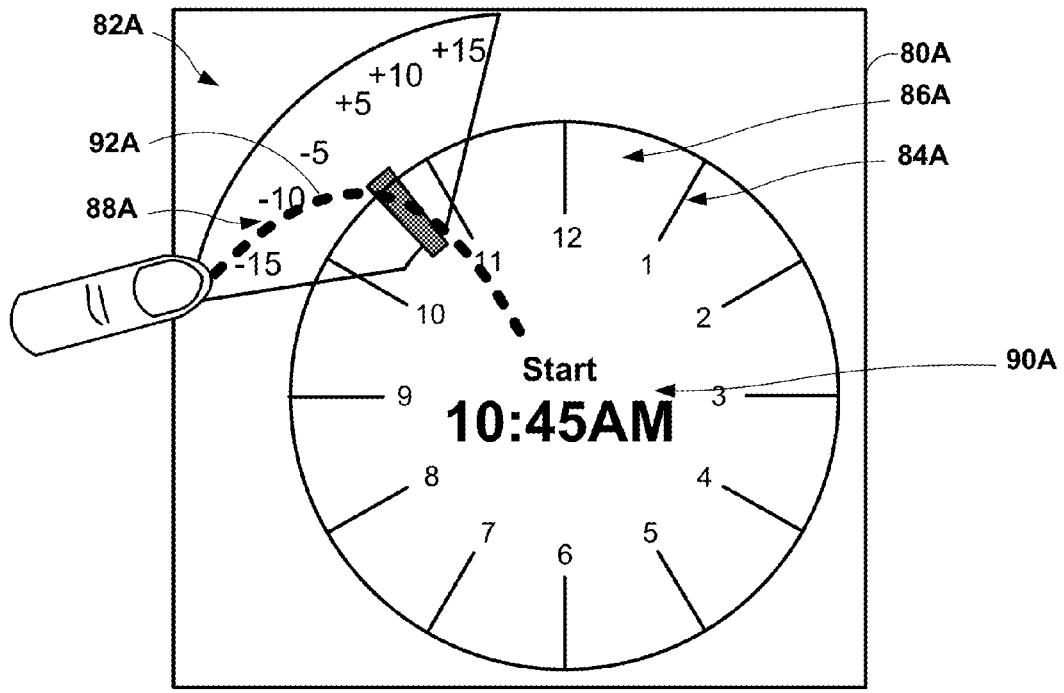
FIGS. 5A-5B are conceptual diagrams illustrating additional example graphical user interfaces, in accordance with one or more aspects of the present disclosure.
Figure 5B:
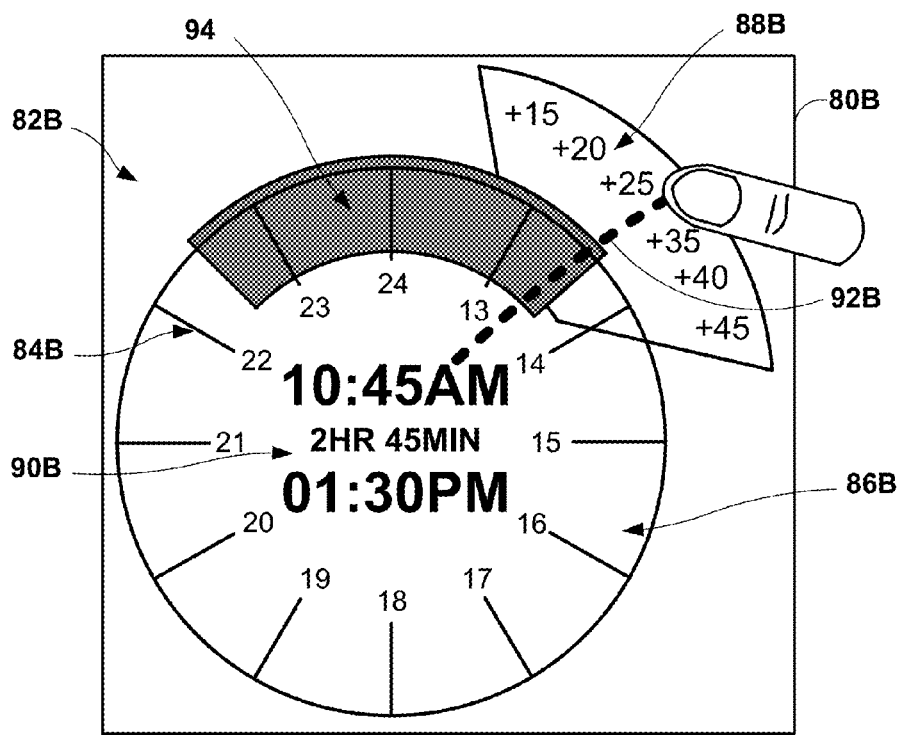

FIGS. 5A-5B are conceptual diagrams illustrating additional example graphical user interfaces, in accordance with one or more aspects of the present disclosure. FIGS. 5A-5B are described below within the context of computing device

10 of FIG. 1 and FIG. 2. Computing device 10 may output user interfaces 80A-80B as shown in the examples of FIGS. 5A-5B for display at presence-sensitive screen 12. For example, an application executing at computing device 10 may invoke clock module 22 of computing device 10 to output user interfaces 80A-80B for entering a start time and an end time associated with a function or operation being performed by the application.

FIG. 5A illustrates user interface 80A that includes a graphical representation of a clock 82A having regions 86A and a first set of time increments 84A as a user of computing device 10 performs gesture 92A at a portion of the presence-sensitive screen at which one of regions 86A of clock 82A is displayed (e.g., the dashed line segment of FIG. 5A illustrates input 92A as a path of a gesture). In one example, an application executing at computing device 10 may invoke clock module 22 of computing device 10 to output clock 82A as a time selector for entering a start time and an end time associated with a function being performed by the application. The user may provide input 92A to enter the start time. Computing device 10 may receive an indication of input 92A from which gesture module 24 may determine one or more touch events based on input 92A. From the touch events associated with input 92A, clock module 22 may determine one of first time increments 84A. Clock module 22 may determine the one of first time increments 84A represented by eleven o'clock as being the determined time increment 84A nearest to the path of input 92A.

FIG. 5A further illustrates that responsive to computing device 10 determining one of the first set of time increments 84A, clock module 22 may command UI module 20 to cause presence-sensitive screen 12 to output for display a second set of time increments 88A proximate to the portion of presence-sensitive screen 12 where the indication of input 92A is received. For example, FIG. 5A illustrates the path of input 92A which traverses across a portion of presence-sensitive screen 12 in-between two of the first set of time increments 84A and proximate to one second time increment 88A.

Computing device 10 may determine time 90A based on the determined one of the first set of time increments 84A and a selected one of the second time increments 88A. That is, clock module 22 may receive one or more touch events about input 92A from gesture module 24. Clock module 22 may compare location data of the touch events to locations associated with each of the second set of time increments 88A. Clock module 22 may determine one of time increments 88A nearest the path of input 92A as being a selected one of time increments 88A. In the example of FIG. 5A, the selected one of time increments 88A corresponds to the one of time increments 88A represented by the value negative fifteen. Clock module 22 may determine time 90A based on the determined one of time increments 84A (e.g., eleven o'clock) and the selected one of time increments 88A (e.g., negative fifteen). In this example, determined time 90A corresponds to forty-five minutes past ten o'clock, or in fifteen minutes to eleven o'clock.

FIG. 5B illustrates user interface 80B that includes a graphical representation of a clock 82B having regions 86B and a first set of time increments 84B as a user of computing device 10 performs gesture 92B at a portion of the presence-sensitive screen at which one of regions 86B of clock 82B are displayed (e.g., the dashed line segment of FIG. 5B illustrates input 92B as a path of a gesture). FIG. 5B illustrates that in some examples, the invoking application from the example of FIG. 5A may cause clock module 22 of computing device 10 to output clock 82B as a time selector for entering the end time associated with the function being performed by the application. The user may provide a second input 92B to enter the end time. Responsive to receiving an indication of second input 92B at a second portion of presence-sensitive screen 12 at which a second one of regions 86B of clock 82B is displayed, computing device 10 may determine a second one of the first set of time increments 84B. In addition, computing device 10 may command UI module 20 to cause presence-sensitive screen 12 to output, for display and proximate to the second portion of presence-sensitive screen 12, the second set of time increments 88B.

In other words, computing device 10 may receive an indication of input 92B from which gesture module 24 may determine one or more touch events based on input 92B. From the touch events associated with input 92B, clock module 22 may determine one of first time increments 84B. Clock module 22 may determine the one of first time increments 84B represented by one o'clock as being the first time increment 84B nearest to the path of input 92B. Clock module 22 may command UI module 20 to cause presence-sensitive screen 12 to output for display a second set of time increments 88B proximate to the portion of presence-sensitive screen 12 where the indication of input 92B is received. For example, FIG. 5B illustrates the path of input 92B which traverses across a portion of presence-sensitive screen 12 in-between two of the first set of time increments 84B and proximate to one second time increment 88B.

FIG. 5B further illustrates that computing device 10 may determine a second time (e.g., an end time) based on the determined second one of the first set of time increments 84B and a second selected one of the second time increments 88B. For example, clock module 22 of computing device 10 may determine a time based on the determined one of the first set of time increments 84B and a selected one of the second time increments 88B. That is, clock module 22 may receive one or more touch events about input 92B from gesture module 24. Clock module 22 may compare location data of the touch events to locations associated with each of the second set of time increments 88B. Clock module 22 may determine one of time increments 88B nearest the path of input 92B as being a selected one of time increments 88B. In the example of FIG. 5B, the selected one of time increments 88B corresponds to the one of time increments 88B represented by the value thirty. Clock module 22 may determine a second time (e.g., an end time) based on the determined one of time increments 84B (e.g., one o'clock) and the selected one of time increments 88B (e.g., thirty). In this example, the second determined time corresponds to thirty minutes past one o'clock PM.

FIG. 5B further illustrates that computing device 10 may output, for display at presence-sensitive screen 12, an indication that the first time is associated with the one of AM and PM and the second time is associated with the different one of AM and PM. In other words, as illustrated by indication 90B, the first time (e.g., start time) shows forty-five minutes after ten o'clock PM and the second time (e.g., end time) shows thirty minutes past one o'clock PM. In other words, clock module 22 may be configured to determine whether a change between AM and PM has occurred from the selection of the first time to the second time and in that case, clock module 22 may present an indication that indicates as such.

FIG. 5B further illustrates that computing device 10 may determine a quantity of time based on the first time and the second time. For example, indication 90B of FIG. 5B illustrates a time duration (i.e., quantity of time) between the first time and the second time. The quantity of time is presented at presence-sensitive screen as text that reads two hours and forty five minutes and is displayed between the first time and second time. As evident by indication 90B, FIG. 5B illustrates that in some examples, computing device 10 may output, for display at presence-sensitive screen 12, at least one of the first time, the second time, and the quantity of time.

In addition to including the quantity of time based on the first time and the second time as indication 90B, FIG. 5B includes indication 94 which represents the determined quantity of time between the first and second times. Indication 94 is illustrated as a shaded area of clock 82B that approximates a region of clock 82B between the first determined one of time increments 84B and the second determined one of time increments 84B.

Figure 6A:
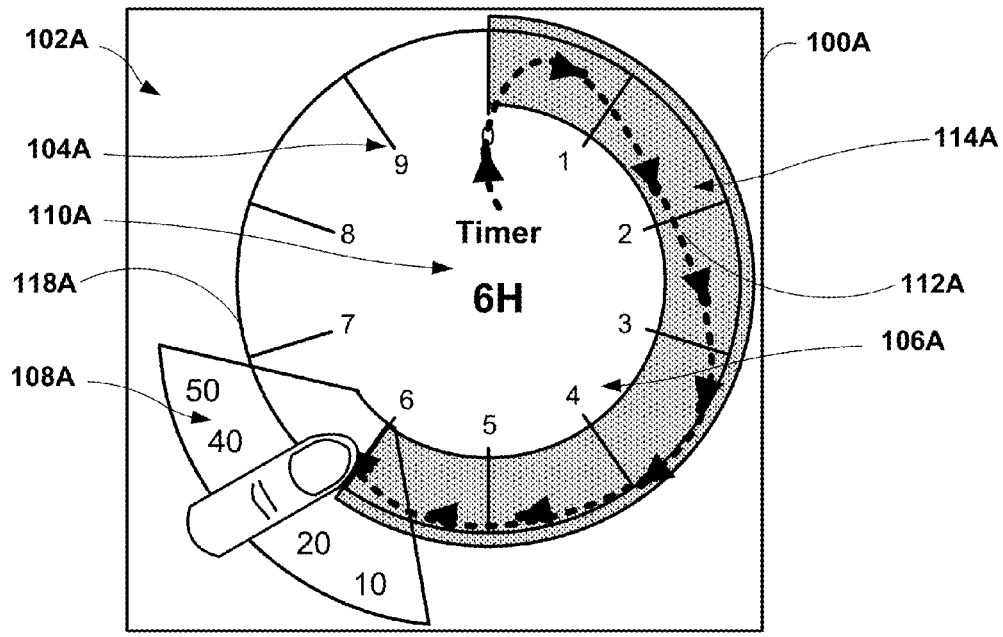
FIGS. 6A-6B are conceptual diagrams illustrating additional example graphical user interfaces, in accordance with one or more aspects of the present disclosure.
Figure 6B:
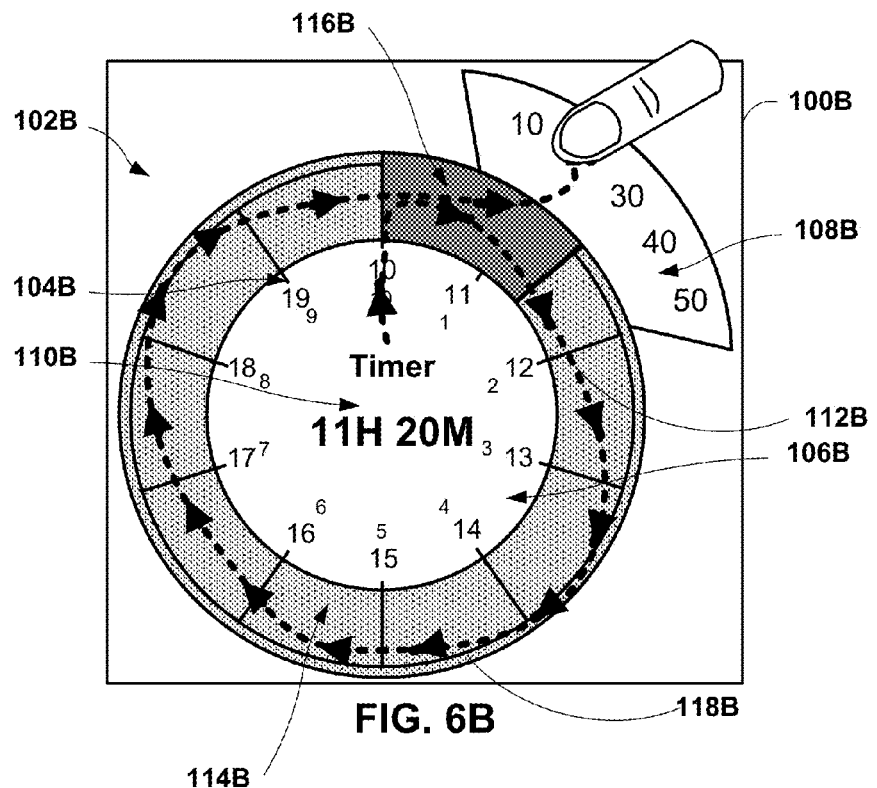

FIGS. 6A-6B are conceptual diagrams illustrating additional example graphical user interfaces, in accordance with one or more aspects of the present disclosure. FIGS. 6A-6B are described below within the context of computing device 10 of FIG. 1 and FIG. 2. Computing device 10 may output user interfaces 100A-100B as shown in the examples of FIGS. 6A-6B for display at presence-sensitive screen 12. For example, a timer application executing at computing device 10 may invoke clock module 22 of computing device 10 to output user interfaces 100A-100B for entering a quantity of time associated with a timer function being performed by the timer application.

FIG. 6A illustrates user interface 100A that includes a graphical representation of a clock 102A having regions 106A and a first set of time increments 104A as a user of computing device 10 performs gesture 112A at a portion of the presence-sensitive screen at which one of regions 106A of clock 102A is displayed (e.g., the dashed line segment of FIG. 6A illustrates input 112A as a path of a gesture). FIG. 6A further illustrates that in some examples, clock 102A may comprise an outer edge 118A and input 112A may comprise a path that traverses a portion of outer edge 118A. Responsive to receiving an indication of input 112A that traverses a portion of outer edge 118A, clock module 22 of computing device 10 may determine one of the first set of time increments 104A. For example, as illustrated by the path of input 112A traversing portions of outer edge 118A, clock module 22 may incrementally determine the one of time increments 104A associated with input 112A as input 112A is detected at presence-sensitive screen 12. In other words, clock module 22 may first determine the one of time increments 104A corresponds to one hour interval of time based on the first portion of input 112A. As more portions of input 112A are detected at presence-sensitive screen 12, and clock module 22 receives additional touch events based on input 112A from gesture module 24, clock module 22 may incrementally adjust the determined time increment 104A. As the path of input 112A travels along outer edge 118A, clock module 22 may cause UI module 20 to output shaded region 114A at presence-sensitive screen 12 to indicate to the user providing input 112A which of time increments 104A is currently being determined by clock module 22. That is, as the path of input 112 circles around regions 106A of clock 102A near outer edge 118A, shaded region 114A may follow user input 112A as input 112A completes a rotation around outer edge 118A. Clock module 22 may change the determined one of time increments 104A from a one hour interval of time, to a two, three, four, five, and eventually six hour interval of time as input 112A travels further along outer edge 118.

In response to determining one of time increments 104A, clock module 22 may command UI module 20 to cause presence-sensitive screen 12 to output, for display, a second set of time increments 108A. That is, when the indication of input 112A no longer moves near a different one of time increments 104A (e.g., a user pauses providing input 112A), clock module 22 may command UI module 20 to cause presence-sensitive screen 12 to output, for display, time increments 108A near the determine one of time increments 104A. Clock module 22 may determine a time 110A based on the determined one of time increments 104A and a selected one of the second time increments 108A (e.g., six hours) and command UI module 20 to cause presence-sensitive screen 12 to output time 110A for display at presence-sensitive screen 12. In some examples, none of the second time increments 108A may be selected (e.g., when a user is continuing to provide input 112A to adjust the determined one of time increments 104A, but momentarily pausing at one of time increments 104A), and in this case, clock module 22 may determine time 110A without relying on a selected one of time increments 108A.

FIG. 6B illustrates user interface 100B that includes a graphical representation of a clock 102B having regions 106B and a first set of time increments 104B as a user of computing device 10 performs gesture 112B at a portion of the presence-sensitive screen at which one of regions 106B of clock 102B are displayed (e.g., the dashed line segment of FIG. 6B illustrates input 112B as a path of a gesture). FIG. 6B illustrates that in some examples, in response to determining time 110B satisfies a threshold, computing device 10 may output, for display, an indication of the threshold being satisfied. In this example, the threshold comprises ten hours. In other examples, the threshold may include any value of time (e.g., twelve hours, ten minutes, sixty seconds, etc.). Clock module 22 may indicate that the threshold has been satisfied by commanding UI module 20 to cause presence-sensitive screen 12 to output shaded region 116B. Shaded region 116B may be a different color or shade than shaded region 114B and may provide visual feedback to indicate the current determined one of time increments 104B. In other examples, shaded region 116B may wrap around the outside of shaded region 114B. In any case, shaded region 116B may provide an indication of determined time 110B exceeding a previous maximum time value attributed to time increments 104B. As illustrated by two values next to time increments 104B, when clock module 22 causes UI module 20 to cause presence-sensitive screen 12 to present shaded region 116B, clock module 22 also changes time increments 104B from the lower values (e.g., zero through nine) to the greater values (e.g., ten through nineteen).

Figure 7:
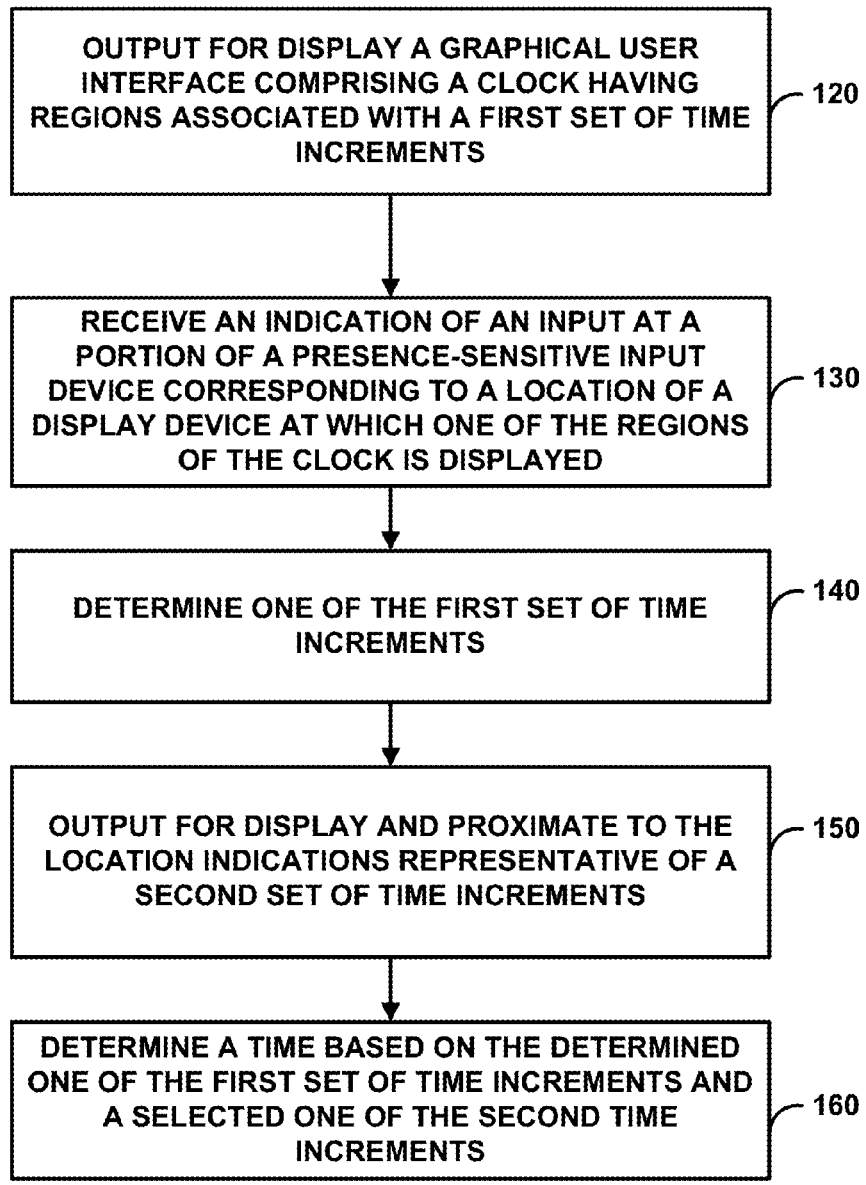
FIG. 7 is a flowchart illustrating an example operation of a computing device, in accordance with one or more aspects of the present disclosure.

FIG. 7 is a flowchart illustrating an example operation of a computing device, in accordance with one or more aspects of the present disclosure. The process of FIG. 7 may be performed by one or more processors of a computing device, such as computing device 10 illustrated in FIG. 1 and FIG. 2. For purposes of illustration only, FIG. 7 is described below within the context of computing devices 10 of FIG. 1 and FIG. 2.

In the example of FIG. 7, a computing device may output for display a graphical user interface comprising a clock having regions associated with a first set of time increments (120). For example, a user of computing device 10 may interact with an application that contains an option for inputting a time. The application may detect a selection of the option and in response, the application may invoke clock module 22 to output clock 30 and handle receipt of a time entry from the user. In response to the invocation, clock module 22 may send data to UI module 20 for outputting user interface 14 including clock 30. In response to the internal communication from clock module 22, UI module 20 may cause UID 12 to output user interface 14 including clock 30 and time increments 34 at a presence-sensitive screen of UID 12.

In the example of FIG. 7, the computing device may receive an indication of an input at a portion of a presence-sensitive input device corresponding to a location of a display device at which one of the regions of the clock is displayed (130). For example, while UID 12 outputs user interface 14 at the presence-sensitive screen of UID 12, UID 12 of computing device 10 may detect a gesture input at the presence-sensitive screen. Gesture module 24 may receive data about the gesture input as UID 12 receives the gesture and process the data input into a group of one or more touch events and share the one or more touch events with UI module 20 and clock module 22.

In the example of FIG. 7, the computing device may determine one of the first set of time increments (140). For example, based on the locations of the one or more touch events, clock module 22 may determine that the touch events represent a gesture at a portion of the presence-sensitive screen of UID 12 at which UID 12 presents one of regions 32 of clock 30. Clock module 22 may further determine that the locations of the one or more touch events represent a gesture at a portion of the presence-sensitive screen of UID 12 nearest to a location of the presence-sensitive screen where UID 12 presents a single one of time increments 34. Clock module 22 may determine one of regions 32 and one of time increments 34 with locations closest to the locations of the touch events based on the gesture. Clock module 22 may determine the touch events represent a selection of the nearest time increment of time increments 34.

In the example of FIG. 7, the computing device may output for display and proximate to the location, an indication representative of a second set of time increments (150). For example, in response to identifying a selection of one time increment of time increments 34, clock module 22 may send a display command to UI module 20 with instructions to output time increments 36. UI module 20 may receive the instructions from clock 22 and cause UID 12 to output, for display at the presence-sensitive screen time increments 36 proximate to the one selected time increment of time increments 34.

In the example of FIG. 7, the computing device may determine a time based on the determined one of the first set of time increments and a selected one of the second time increments (160). For example, after clock module 22 sends instructions to UI module 20 to cause UID 12 to output time increments 36 at the presence-sensitive screen and at a location near the selected time increment of time increments 34, clock module 22 may receive additional touch events from gesture module 24. Gesture module 24 may generate the additional touch events while continuing to receive the indication of the user input. Clock module 22 may determine a selected one of time increments 36 by comparing the location data of time increments 36 received from UI module 20 with the locations of the additional touch events. The selected one of time increments 36 may correspond to one of time increments 36 having a location nearest the additional touch events. Clock module 22 may determine a selected one of one of time increments 36. Clock module 22 may determine a time based on the determined one of time increments 34 and the selected one of time increments 36. For example, clock module 22 may combine a time value associated with the one of time increments 34 with a time value associated with the one of time increments 36 to determine a time based on the user input. Clock module 22 may command UI module 20 to cause UID 12 to output the determined time for display at the presence-sensitive screen of UID 12. Clock module 22 may output the determined time to the invoking application.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments of the invention have been described. These and other embodiments are within the scope of the following claims.

What is claimed is:

1. A method comprising:
outputting, by a computing device and for display, a graphical user interface comprising a clock having regions associated with a first set of time increments;
responsive to receiving an indication of an input at a portion of a presence-sensitive input device corresponding to a location of a display device at which one of the regions of the clock is displayed, determining, by the computing device, one of the first set of time increments and outputting, for display and proximate to the location, a second set of time increments; and
determining, by the computing device, a time based on the determined one of the first set of time increments and a selected one of the second time increments.

2. The method of claim 1, wherein the second set of time increments is of finer-grain time increments than the first set of time increments.

3. The method of claim 1, wherein the first set of time increments comprise at least one of one day increments of time, one hour increments of time, one half hour increments of time, one minute increments of time, and one second increments of time.

4. The method of claim 1, where each increment in the second set of time increments comprises a fractional value of each increment in the first set of time increments.

5. The method of claim 1, wherein the selected one of the second time increments is based on the user input.

6. The method of claim 1, further comprising:
outputting, by the computing device and for display, the determined time.

7. The method of claim 1, further comprising:
outputting, by the computing device and for display, an indication of the determined time at one or more of the regions of the clock.

8. The method of claim 1, where the determined time is associated with one of AM and PM, the method further comprising:
outputting, by the computing device and for display, an indication of the one of AM and PM.

9. The method of claim 1, wherein the determined time is associated with at least one of a calendar event, a timer setting, and a system clock setting.

10. The method of claim 1, wherein the presence-sensitive input device comprises a presence-sensitive screen at which the graphical user interface is displayed.

11. The method of claim 1, wherein the input comprises at least one of one or more tap gestures and one or more non-tap gestures.

12. The method of claim 1, wherein the input is a first input, wherein the portion is a first portion, wherein the location is a first location, wherein the one of the regions of the clock is a first one of the regions, wherein the time is a first time, wherein the one of the first set of time increments is a first one of the first set of time increments, and wherein the selected one of the second time increments is a first selected one of the second time increments, the method further comprising:
responsive to receiving an indication of a second input at a second portion of the presence-sensitive input device corresponding to a second location of the display device at which a second one of the regions of the clock is displayed, determining, by the computing device, a second one of the first set of time increments and outputting, for display and proximate to the second portion, the second set of time increments; and
determining, by the computing device, a second time based on the determined second one of the first set of time increments and a second selected one of the second time increments.

13. The method of claim 12, wherein the first time is associated with one of AM and PM and the second time is associated with a different one of AM and PM, the method further comprising:
outputting, by the computing device and for display, an indication that the first time is associated with the one of AM and PM and the second time is associated with the different one of AM and PM.

14. The method of claim 12, further comprising:
determining, by the computing device, a quantity of time, based on the first time and the second time.

15. The method of claim 14, further comprising:
outputting, by the computing device and for display, an indication of the quantity of time.

16. The method of claim 14, further comprising:
outputting, by the computing device and for display, at least one of the first time, the second time, and the quantity of time.

17. The method of claim 1, further comprising:
in response to determining the time satisfies a threshold, outputting, by the computing device and for display, an indication of the threshold being satisfied.

18. The method of claim 1, wherein the location is a first location, wherein the clock comprises an outer edge and the input comprises a path that traverses at least a portion of the presence-sensitive input device corresponding to a second location of the display device at which the outer edge is displayed.

19. A computing device comprising:
at least one processor,
wherein the at least one processor is configured to:
output, for display, a graphical user interface comprising a clock having regions associated with a first set of time increments;
responsive to receiving an indication of an input at a portion of a presence-sensitive input device corresponding to a location of a display device at which one of the regions of the clock is displayed, determine, one of the first set of time increments and output, for display and proximate to the location, a second set of time increments; and
determine, a time based on the determined one of the first set of time increments and a selected one of the second time increments.

20. A computer-readable storage medium encoded with instructions that, when executed, cause at least one processor of a computing device to:
output, for display, a graphical user interface comprising a clock having regions associated with a first set of time increments;
responsive to receiving an indication of an input at a portion of a presence-sensitive input device corresponding to a location of a display device at which one of the regions of the clock is displayed, determine, one of the first set of time increments and output, for display and proximate to the location, a second set of time increments; and
determine, a time based on the determined one of the first set of time increments and a selected one of the second time increments.

* * * * *